Oct. 25, 1949.   W. L. ALDREDGE, SR   2,485,684
FISH BOX FOR BOATS
Filed Sept. 16, 1948
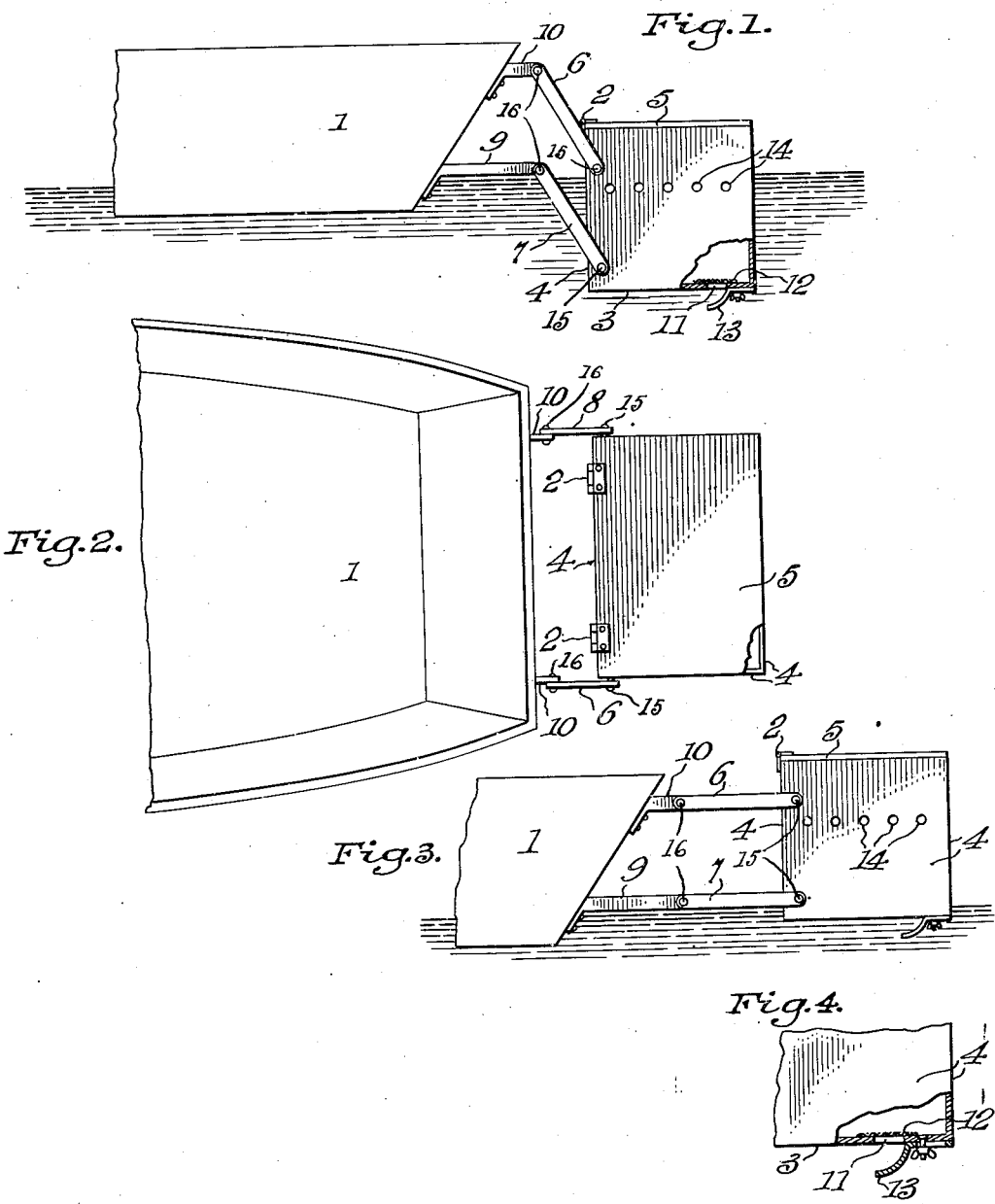
Inventor
William L. Aldredge, Sr.
By Roland H. Linger
ATTORNEY Patented Oct. 25, 1949

2,485,684

UNITED STATES PATENT OFFICE 2,485,684

FISH BOX FOR BOATS

William L. Aldredge, Sr., Largo, Fla.

Application September 16, 1948, Serial No. 49,615

3 Claims. (Cl. 43—55)

My invention relates to fish boxes and more particularly to a fish box in which live fish may be kept and which is adapted to be fastened to a fishing boat without interfering with the operation thereof.

The design of prior art devices of this class with which I am acquainted have been such as to materially interfere with the normal operation of the fishing boat with which they are used. Attempts have been made to minimize such interference but have only achieved a fair result. One such device is disclosed in United States Patent No. 2,272,569, granted February 10, 1942, to W. N. Luhmann. While perhaps satisfactory for use in connection with slow moving boats, the prior art devices have not proven entirely satisfactory for use with modern power boats which reach relatively high speeds when travelling between fishing spots. I have discovered that the unsatisfactory operation is due largely to the fact that these earlier devices leave the fish boxes in the water when moving. The resultant turbulence and drag put a strain on the boat and, furthermore, tend to cause bruising of the fish within the box.

Accordingly, it is an object of my invention to provide a live fish box for attachment to fishing boats which will not interfere with the operation of the boat.

Another object of my invention is to provide a device of the class described which is automatically carried out of the water while the boat is moving and which is automatically placed beneath the water when the boat is at rest.

A further object of my invention is to provide a boat carried fish box in which the water level remains substantially constant as the box is raised and lowered from the water by means of the movement of the boat.

Still another object of my invention is to provide means for automatically replenishing the water within a fish box.

The above and other objects and advantages of my invention will become apparent upon a consideration of the following detailed description of a preferred embodiment thereof taken in conjunction with the accompanying drawings in which:

Fig. 1 is a side view of a box attached to the stern of a boat in accordance with the invention, while the boat is at rest, Fig. 2 is a plan view of Fig. 1, Fig. 3 is a side view showing the position taken by the box while the boat is moving, and Fig. 4 is an enlarged view of a portion of the box.

Referring to Figs. 1 and 2, there is shown a portion of a boat 1 to which is connected the fish box. The fish box may be of any desired construction; however, I have chosen for purposes of illustration a rectilinear box having a substantially rigid bottom 3, sides 4, and a top 5, attached by suitable hinges 2. The box is attached to the boat by means of pivoted arms on either side of the box, only three of which, 6, 7, and 8, are shown. These arms are pivotally attached at one end by means of horizontal pins 16, to suitable brackets attached to the boat and at the other end by similar pins 15 to brackets attached to the box. By suitable construction of the arms or the material from which the box is made, it is arranged to assume a position such that the upper portion of the box extends above the surface of the water when the boat is at rest. In order to give a smoother action to the device the pivot points of the lower boat brackets 9 are preferably placed in vertical alignment with the pivot points of the upper boat brackets 10. However, it will be clear that by suitably shaping the container so that the bottom will be approximately horizontal when the container is in its raised position the brackets may be of any convenient shape or size.

In Fig. 1, a portion of one side of the fish box is cut away to show the construction of the means for replenishing the water within the container. This construction is more clearly shown in Fig. 4. An opening 11 which may be small enough to prevent the escape of fish placed within the container or which may have a screen 12 placed thereover as shown, is provided in the bottom of the container. A scoop-like member 13 extends along the rear edge of the opening and has its lip facing the direction of movement of the boat. The scoop is preferably attached by means of bolts provided with wing nuts whereby the size of the opening may be adjusted to admit the proper amount of water while the boat is moving.

In order to provide for circulation of fresh water through the container and to prevent too much water being placed into the container a series of drain openings 14 are placed in the sides of the container.

The operation of my improved fish box will be apparent from the above description and a consideration of Figs. 1 and 3. With the boat at rest, as shown in Fig. 1, the container will, by the force of gravity, be partially submerged, the degree of submersion being dependent upon the length of the arms 6 and 7. Because of the opening 11 in the bottom of the container and the openings 14 in the sides, the container will be filled with water to the level of the surrounding water. The natural movement of the water will cause a circulation thereof through the container insuring continual replenishment of the water in the container.

With the boat in motion, as shown in Fig. 3, the pressure of the water will cause the container to rise in a vertical plane until it planes across the surface of the water. Thus there will be offered substantially no drag or other impediment to the usual operation of the boat. At the same time, the scoop 13 will cause a stream of water to be forced upwards and into the container. By suitably designing the size of the bottom opening and the scoop it is possible to maintain the level of water within the container at the line of the drain holes in the sides. Since the position of the scoop is adjustable, it is possible to vary the size of the opening to accommodate different boats having different speeds so that the water level is just maintained. This insures a continual replenishment of the water within the container at all times, without causing bruising of the fish because of undue turbulence.

While I have described my invention with particularity, it will be clear that various modifications may be made without departing from the spirit of the invention. Thus, two arrangements have been shown for attaching the container to the boat. Other arrangements will readily suggest themselves to those skilled in the art. Any convenient means which will allow movement of the container to a vertical plane may be used. Again, I have illustrated the top of the container as being hinged at the stern side of the container. While this construction results in the forward movement of the boat automatically closing and keeping closed the cover, any other suitable type of closing may be used. It is also noted that the shape of the bottom of the container need not be flat, as shown, but may be suitably designed to aid in raising the container to the surface of the water as the boat is moved.

What I claim is:

1. The combination of a boat and a bait box, wherein the bait box has openings in the upper portion thereof and an inlet in the lower portion thereof, with a coupling between the boat and bait box, said coupling having pivotal connections to a side of the boat and a wall of the bait box, and a member between said connections whereby movement of the bait box relative to the boat will be limited to a vertical direction.

2. The combination of a boat, a bait box having openings in the upper portion thereof and an inlet in the lower portion thereof and a coupling between the boat and the bait box, said coupling having spaced pivotal connections with the boat and bait box, said pivotal connections being provided with horizontal pins in parallel relation for limiting the movement of the bait box relative to the boat to a vertical direction during travel of the boat and bait box in water.

3. The combination of a boat and a bait box, said bait box having apertures in the upper portion thereof and a refilling opening in the lower portion thereof, with means pivotally connecting a lower portion of the bait box to the boat, and means parallel to the first means for pivotally connecting an upper portion of the bait box to the boat, whereby movement of the boat in one direction will cause said bait box to move vertically towards the surface of the water and simultaneously force water into said bait box.

WILLIAM L. ALDREDGE, Sr.,

REFERENCES CITED

The following references are of record in the file of this patent:

UNITED STATES PATENTS

| Number | Name | Date |
| --- | --- | --- |
| 2,149,996 | Gulden | Mar. 7, 1939 |
| 2,152,768 | Myers | Apr. 4, 1939 |
| 2,272,569 | Luhmann | Feb. 10, 1942 |
| 2,387,352 | Radick | Oct. 23, 1945 |

FOREIGN PATENTS

| Number | Country | Date |
| --- | --- | --- |
| 68,398 | Sweden | May 11, 1928 |